Patented June 1, 1943

2,320,426

UNITED STATES PATENT OFFICE 2,320,426

WOOD STAIN SOLVENT

Henry G. Goodman, Jr., Pittsburgh, Pa., assignor to Carbide and Carbon Chemicals Corporation, a corporation of New York No Drawing. Application June 1, 1940, Serial No. 338,377

12 Claims. (Cl. 8—6.5)

The invention concerns dye stains, especially solutions of dyes capable of considerable penetration of such substances as wood without causing appreciable raising of the surface fibers or grain, and it includes improved solvent vehicles for use in these staining compositions.

The use of polyhydroxy alcohols as solvents for water-soluble or alcohol-insoluble aniline dyes, or for the purpose of assisting in dissolving such dyes in the common organic solvents, in which the dyes are otherwise practically insoluble, has the disadvantage that the resulting dye solutions may be too hygroscopic for certain uses. For example, one of the difficulties attendant on the use of ethylene glycol or glycerol in non-grain-raising wood stains is the relatively large amount of the polyhydroxy alcohol required in order to secure a dye concentration which is sufficiently high for some desired uses and applications. The larger the amount of the hygroscopic material there is present in the wood stain, the greater the tendency for raising of the grain to occur, due to absorption or retention of moisture by the polyhydroxy alcohol remaining in the wood. In the case of veneer staining, the presence of the polyhydroxy alcohol in excessive amounts tends also to affect the glue holding the veneer.

The principal objects of the present invention are to overcome these disadvantages and to provide improved dye stain solutions, as well as improvements in the staining of wood and the like.

I have found that these objects can be achieved and that solvents and vehicles yielding stains of bright, desirable properties can be obtained by incorporating in the organic liquid in which the dye stain is dissolved or dispersed, a suitable amount of an addition substance which is an acid amide having the structural formula:

in which R may be hydrogen or an acyl radical, and X may be hydrogen or a hydrocarbon radical. By the use of the addition substance in the dye stain solvent or vehicle, in accordance with the present invention, the capacity of the solvent or vehicle for dissolving or dispersing water-soluble, alcohol-soluble, or acid aniline dye stains, for retaining them in solution is susbtantially improved without increase in undesirable hygroscopicity. Also, by the use of the addition substance in dye stain solutions prepared according to this invention, it is possible to reduce the amount of polyhydroxy alcohol otherwise required for a given concentration of the dye stain.

In addition to the polyhydric alcohol and the addition substance, the dye stain solvent or vehicle may contain a volatile common organic solvent such as, for instance, an aliphatic monohydroxy alcohol as illustrated by methanol, ethanol, and isopropanol. Exceptionally good results have been obtained using methanol in an amount which is about 87% of the total weight of the solvent or vehicle.

It has also been found that the addition of certain other materials to the dye stain solvents or solutions containing the addition substance together with the mono and polyhydroxy alcohols give further improved results. Thus various aliphatic and aromatic hydrocarbons, such as petroleum distillate, gasoline, solvent naphtha, benzene, toluene, ethyl benzene, xylene and the like may be added. Toluene is preferred, however, in an amount about equal to the quantity of polyhydroxy alcohol employed.

Thus it may be seen that the proportions of materials used according to this invention may be varied over a wide range in the dye stain solvent or vehicle, and particularly by the dilution of the dye stain solution with the solvents or diluents or mixtures of them commonly used in the staining art.

The dye stain solvent or vehicle of this invention, is capable of dissolving or retaining in dispersion substantial quantities of acid or water-soluble aniline dyes of a type suitable for use as staining dyes, of which the following are representative:

National Buffalo Black NBR (Color Index No. 246)—National Aniline and Chemical Co.
National Wool Orange A Conc. (Color Index No. 151)—National Aniline and Chemical Co.
National Croecine Scarlett MOO (Color Index No. 252)—National Aniline and Chemical Co.
Amacid Brilliant Croecine 3BA Conc. (Color Index No. 252)—American Aniline Products Co.
Amacid Yellow M. Conc. (Color Index No. 138)—American Aniline Products Co.
Metanil Yellow Extra Conc.—General Dyestuffs Corporation.

Storage tests indicate that no deterioration of the dyestuff results when it is dissolved in solvents prepared according to the present invention, even though the dye solution stands over a long period of time. For instance, the shades obtained after one to two months' standing were the same and were as bright as those obtained from freshly prepared mixtures.

The following examples are given as illustrative of the invention:

*Example I*

| | Parts by weight |
|---|---|
| Ethylene glycol | 6 |
| Toluene | 5 |
| Methanol | 84 |
| Acetoacetamide | 3 |
| Water | 2 |

*Example II*

| | Parts by weight |
|---|---|
| Ethylene glycol | 6 |
| Toluene | 5 |
| Methanol | 84 |
| Acetoacetanilide | 3 |
| Water | 2 |

One gram of water-soluble red aniline dye, such as is used for wood staining, was added to 100 cc. of each of the solutions of the foregoing examples. The solubility was practically complete in the cold, and the resulting solutions when applied to wood were very satisfactory from the standpoint of the solubility of the dye and the depth of the color stain.

The stability of the above solutions was tested at the end of two weeks as follows: Fresh stain solutions containing one gram of a water-soluble red aniline dye in 100 cc. of the solvent mixtures of Example I and Example II were prepared. Additional solutions containing one gram of water-soluble yellow aniline dye in 100 cc. of each of the same solvent mixtures were also prepared. Since mixed color tests are known to exaggerate greatly minute changes in the pure colors, one part of each of the two weeks old red solutions and of the fresh red solutions was mixed with a like amount of the fresh yellow solution in the same solvent. Wood panels were then stained with each of the four mixtures and observed for a difference in the orange shades resulting from the two mixtures containing the aged red stain and the two mixtures containing the newly-prepared red stain. No difference could be observed. Thus, the acetoacetamide and the acetoacetanilide were shown to exhibit no appreciable effect upon the red dye in solution.

Additional stain solutions were prepared for longer storage tests. These consisted of a total of six solutions (three red; three yellow) containing one gram of the red dye or one gram of the yellow dye in each of the following solvent mixtures:

*Example III*

| | Parts by weight |
|---|---|
| Ethylene glycol | 5.6 |
| Toluene | 5.2 |
| Methanol | 85.6 |
| Acetamide | 2 |
| Water | 2 |

*Example IV*

| | Parts by weight |
|---|---|
| Ethylene glycol | 5.6 |
| Toluene | 5.2 |
| Methanol | 85.6 |
| Acetoacetanilide | 2 |
| Water | 2 |

*Example V*

| | Parts by weight |
|---|---|
| Ethylene glycol | 5.6 |
| Toluene | 5.2 |
| Methanol | 85.6 |
| Acetoacetamide | 2 |

A comparison of the dye stain solutions of the solvents of Examples III, IV and V was immediately made by mixing one part of the reds with one part of the yellow to obtain an orange as described above. Examination of the resulting orange shade indicated that the color value was the same in each case.

These red and yellow solutions were thereupon stored over a period of two weeks and subsequently tested by mixing with a fresh solution of an opposite color, and comparing with an identical mixture prepared from fresh solutions of the color being examined and of the opposite color. By way of illustration, in examining a red solution, one part of the aged red solution was mixed with four parts of a fresh yellow solution. Simultaneously, one part of a freshly prepared red solution was mixed with four parts of the same yellow solution. Stains were prepared from each of these mixtures and compared for differences in shade, and after two weeks no change in the stain shade could be observed in either the red or yellow solutions. For a substantially longer period of aging of the red solution, the solvent of Example V is preferred over those of Examples III and IV.

An additional inspection of these solvents of Examples III, IV and V was made by preparing similar solutions using in each instance one gram of water-soluble black aniline and of water-soluble orange aniline. When freshly prepared, or after aging two weeks, no difference could be observed between stains produced by any of the solvents of Examples III, IV and V, except that the two weeks old solution of one gram of the orange dye dissolved in the solvent of Example III, which solution appeared to give a difference in the brown shade produced when mixed with a freshly prepared solution of the black dye in the same solvent.

The dye stain solvent or vehicle of this invention has the additional advantage that it may be prepared in a more concentrated form with respect to the volatile common organic solvent, as illustrated by the following example:

*Example VI*

| | Parts by weight |
|---|---|
| Ethylene glycol | 16.9 |
| Toluene | 15.6 |
| Methanol | 61.6 |
| Acetoacetanilide | 5.9 |

No crystallization of acetoacetanilide occurred on storing this concentrate at a temperature as low as 0° C. If desired, the dye stain may first be dissolved in the solvent concentrate containing the lesser quantity of the monohydric aliphatic alcohol. The solution of the dye stain in the solvent concentrate is well adapted to yield, on dilution, non-grain-raising wood stains which likewise are permanent, light-fast, and non-bleeding into lacquer top coats according to the particular dye used.

In general the addition substance may comprise from about one percent to about fifteen percent of the solvent vehicle and preferably from about two percent to about ten percent.

It will be understood that various changes and modifications of the methods and specific details set forth may be made within the scope of this invention.

I claim:

1. A composition of matter adapted for the production of non-grain-raising wood stains upon dispersion therein of a staining dye, said composition comprising a volatile common organic solvent, a polyhydroxy alcohol, and a compound of the formula

RCH₂CO-NHX in which R is an acyl radical and X is one of the group consisting of hydrogen and a monocyclic aromatic hydrocarbon radical.

2. A composition of matter adapted for the production of non-grain-raising wood stains upon dispersion therein of a staining dye, said composition comprising the following in parts by weight:

| | Parts |
|---|---|
| Ethylene glycol | about 6 |
| Toluene | about 5 |
| Methanol | about 84 |
| Addition substance | about 2 to 3 | such addition substance being of the formula

CH₃COCH₂CO-NHX in which X is one of the group consisting of hydrogen and a monocyclic aromatic hydrocarbon radical.

3. A solvent vehicle concentrate adapted for the production of dye stains upon dispersion therein of a staining dye of the type which is normally insoluble in volatile hydrocarbon, said concentrate having substantially the following composition in parts by weight:

| | Parts |
|---|---|
| Ethylene glycol | 6 |
| Toluene | 5 |
| Methanol | 61.6 to 84 |
| Acetoacetanilide | 2 to 3 |

4. A dye solution of the type adapted for the production of non-grain-raising wood-stains and comprising a staining dye of the type which is normally soluble in water or in alcohol, dispersed in a solvent vehicle for such dye, said solvent vehicle being characterized by the presence therein of a polyhydroxy alcohol and a compound of the formula

CH₃COCH₂CO-NHX in which X is one of the group consisting of hydrogen and a monocyclic aromatic hydrocarbon radical.

5. A wood stain composition comprising a staining dye dispersed in a solvent vehicle therefor including a polyhydroxy alcohol, a compound of the formula

CH₃COCH₂CO-NHX in which X is one of the group consisting of hydrogen and a monocyclic aromatic hydrocarbon radical, and a volatile common organic solvent.

6. A wood stain composition comprising a staining dye dispersed in a solvent vehicle therefor including the following substances in parts by weight approximately as follows:

| | Parts |
|---|---|
| Ethylene glycol | 6 |
| Toluene | 5 |
| Methanol | At least 84 |
| Addition substance | 2 to 3 | said addition substance being of the formula

CH₃COCH₂CO-NHX in which X is one of the group consisting of hydrogen and a monocyclic aromatic hydrocarbon radical.

7. A method of staining which comprises applying to a surface of material such as wood and the like staining dye dispersed in a solvent vehicle comprising a volatile common organic solvent including a lower aliphatic alcohol; an alkylene glycol and a relatively volatile substance of the benzene series in about equal amounts; and a lesser amount of a compound of the formula

CH₃COCH₂CO-NHX in which X is one of the group consisting of hydrogen and a monocyclic aromatic hydrocarbon radical.

8. A method of staining which comprises applying to a surface of material such as wood and the like, a staining dye dispersed in a solvent-vehicle comprising the following in parts by weight:

| | Parts |
|---|---|
| Ethylene glycol | 6 |
| Toluene | 5 |
| Methanol | 61.6 to 84 |
| Acetoacetanilide | 2 to 3 |

9. A composition of matter adapted for the production of non-grain-raising wood stains upon dispersion therein of a staining dye, said composition comprising a common volatile organic solvent including a lower aliphatic alcohol; ethylene glycol and a member of the benzene series of hydrocarbons in about equal amounts; a lesser amount of acetoacetamide; said lower aliphatic alcohol being present in an amount at least sufficient to maintain said composition in a substantially homogeneous solution.

10. A composition of matter adapted for the production of non-grain-raising wood stains upon dispersion therein of a staining dye, said composition comprising a common volatile organic solvent including a lower aliphatic alcohol; ethylene glycol and a member of the benzene series of hydrocarbons in about equal amounts; a lesser amount of acetoacetanilide; said lower aliphatic alcohol being present in an amount at least sufficient to maintain said composition in a substantially homogeneous solution.

11. A wood stain composition comprising a staining dye dispersed in a solvent-vehicle therefor including the following substances in parts by weight approximately as follows:

| | Parts |
|---|---|
| Ethylene glycol | 6 |
| Toluene | 5 |
| Methanol | At least 84 |
| Acetoacetamide | 2 to 3 |

12. A wood stain composition comprising a staining dye dispersed in a solvent-vehicle therefor including the following substances in parts by weight approximately as follows:

| | Parts |
|---|---|
| Ethylene glycol | 6 |
| Toluene | 5 |
| Methanol | At least 84 |
| Acetoacetanilide | 2 to 3 |

HENRY G. GOODMAN, Jr.